V. E. EDWARDS.
LEADING SPINDLE FOR ROLLING MILLS.
APPLICATION FILED DEC. 6, 1909.

994,069.

Patented May 30, 1911.

Witnesses
R. D. Tolman
Penelope Combarbach

Inventor
Victor E. Edwards.
By Rufus B. Fowler
Attorney

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

LEADING-SPINDLE FOR ROLLING-MILLS.

994,069. Specification of Letters Patent. Patented May 30, 1911.

Application filed December 6, 1909. Serial No. 531,503.

*To all whom it may concern:*

Be it known that I, VICTOR E. EDWARDS, a citizen of the United States, residing at Worcester, in the county of Worcester and Commonwealth of Massachusetts, have invented a new and useful Improvement in Leading - Spindles for Rolling - Mills, of which the following is a specification, accompanied by drawings forming a part of the same, in which—

Figure 3:
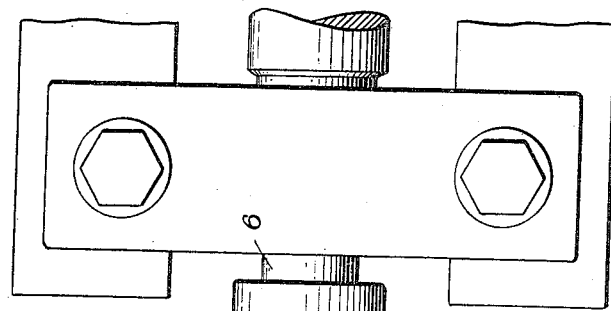
Figure 3:
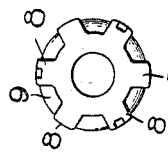
Figure 1:
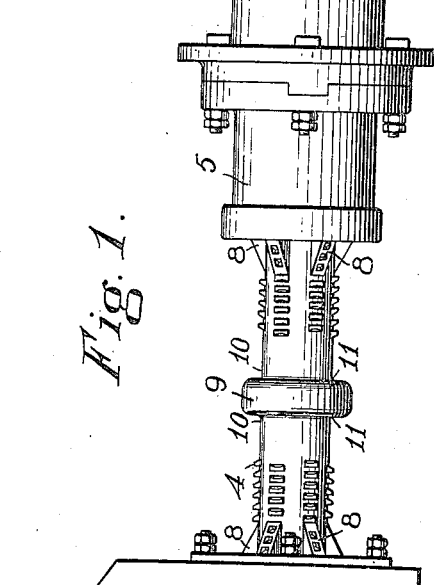
Figure 2:
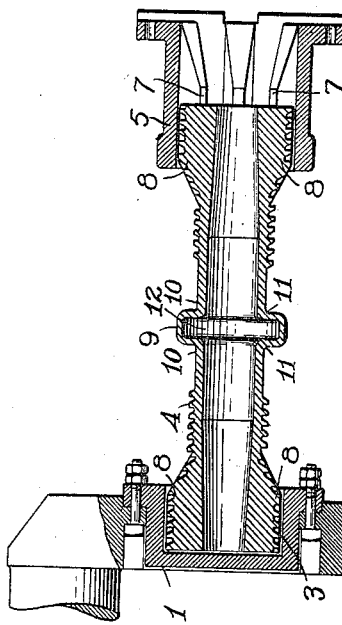

Figure 1 represents in front elevation the cranked end of an engine driving shaft and the opposing gudgeon of a rolling mill operatively connected by a leading spindle embodying my invention. Fig. 2 represents the same shown in central sectional view and Fig. 3 is an end view of the leading spindle.

Similar reference characters refer to similar parts in the different views.

The object of my present invention is to provide a leading spindle having a weakened or breaking section in the central portion of the spindle and capable, when a fracture occurs, of a longitudinal collapsing or telescopic movement at its breaking section, and this object is accomplished by means of the construction hereinafter described, the novel features being pointed out in the annexed claims.

Referring to the accompanying drawings, 1 denotes an overlapping cranked arm on the end of an engine driving shaft 2 provided with a socket 3 to receive the end of a leading spindle 4, the opposite end of the leading spindle 4 being inserted in a coupling 5 attached to a rolled gudgeon 6 of a rolling mill. The socket 3 and coupling 5 are each provided with interior flutes, those in the coupling 5 being shown at 7, Fig. 2, and adapted to engage the ends of the leading spindle which are provided with exterior flutes 8, Fig. 3. The leading spindle 4 is hollow and preferably circular in cross section, with the walls of the central section preferably reduced in thickness to provide a breaking section when an undue strain is brought upon the spindle, causing the breakage to occur between the engaging ends of the spindle.

Within the breaking section of the spindle its diameter is increased for a portion of its length, as shown at 9, the interior diameter of the section 9 being greater than the exterior diameter of the immediately adjacent sections 10, 10, the connecting walls between the section 9 and sections 10 being preferably at right angles to the axis of the leading spindle, as shown at 11, Fig. 2.

It has been found in practice that a fracture in the breaking section of the spindle usually occurs upon a diagonal line, and the fractured ends act as cam surfaces by the rotation of one against the other to bring an undue end thrust upon the spindle. The undue end thrust upon the spindle in the event of breakage is relieved by my present construction by enabling a longitudinal collapsing or telescopic movement of the two sections to take place, that portion of the spindle at the side of the section 9 being capable of moving into a chamber 12 inclosed within the enlarged section 9.

I claim,

1. A hollow leading spindle in an integral piece arranged to connect driving and driven members, with the walls of a portion of said spindle between said driving and driven members reduced in thickness to form a breaking section, and with the diameter of said breaking section increased, thereby providing for the telescopic movement of said spindle into said breaking section when said spindle breaks.

2. A hollow leading spindle in an integral piece arranged to connect driving and driven members, with a portion of said spindle between said driving and driven members arranged to form a breaking section, and with the interior diameter of said breaking section greater than the exterior diameter of the remainder of said spindle between said members on either side of said breaking section, thereby permitting the telescopic movement of the remaining portions of said spindle into said breaking section when a breakage occurs.

3. A leading spindle in an integral piece having fluted ends, and with a portion of said spindle between the ends hollow to form a breaking section, with the internal diameter of said breaking section greater than the external diameter of the remainder of the spindle between the ends, arranged to permit the telescopic movement of the remaining portions of said spindle into said breaking section when a breakage occurs.

4. A leading spindle in an integral piece arranged to connect driving and driven members, with a portion of said spindle between said members hollow and with the interior diameter of the hollow portion greater than the exterior diameter of an adjacent portion of the spindle between said members, thereby permitting an endwise telescopic movement of the spindle between said members when the spindle breaks.

5. A leading spindle in an integral piece arranged to connect driving and driven members, having a hollow chamber in a portion of the spindle between said members, with the interior diameter of said chamber greater than the exterior diameter of the spindle between said members adjacent to said chamber, with the side walls of said chamber at an angle to the axis of the spindle.

Dated this third day of December 1909.

VICTOR E. EDWARDS.

Witnesses:
W. A. WINN,
F. M. LORD.

---

Copies of this patent may be obtained for five cents each, by addressing the "Commissioner of Patents, Washington, D. C."